United States Patent [19]

Mohn

[11] Patent Number: 5,068,554
[45] Date of Patent: Nov. 26, 1991

[54] ELECTRIC MOTOR

[75] Inventor: Frank Mohn, London, England

[73] Assignee: Framo Developments (UK) Limited, London, England

[21] Appl. No.: 400,773

[22] Filed: Aug. 30, 1989

[30] Foreign Application Priority Data

Aug. 30, 1988 [GB] United Kingdom ............... 8820444

[51] Int. Cl.$^5$ .......................................... H02K 41/00
[52] U.S. Cl. ...................................... 310/12; 310/112; 310/126
[58] Field of Search ................. 310/12, 112, 268, 126; 175/61, 104, 107; 318/115, 135

[56] References Cited

U.S. PATENT DOCUMENTS

| | | | |
|---|---|---|---|
| 3,048,723 | 8/1962 | Watson | 310/77 |
| 4,607,197 | 8/1986 | Conrad | 318/115 |
| 4,844,180 | 7/1989 | Zijsling | 175/107 |

FOREIGN PATENT DOCUMENTS

| | | |
|---|---|---|
| 0201021 | 11/1986 | European Pat. Off. |
| 0208467 | 1/1987 | European Pat. Off. |
| 2451718 | 2/1979 | Fed. Rep. of Germany |
| 61-139245 | 6/1986 | Japan |
| 2174252 | 10/1986 | United Kingdom |

Primary Examiner—Steven L. Stephan
Assistant Examiner—Judson H. Jones
Attorney, Agent, or Firm—Young & Thompson

[57] ABSTRACT

An electric motor suitable for incorporation in pipestacks for drilling and pumping applications has a drive shaft (4) carrying spaced rotor discs (6) driven by annular stator windings (7) carried by the motor housing wall. The windings (7) are organized as linear motors operating on a circular path and provision can be made for energization of the windings so as to cause axial movement of the shaft, for hammering or braking action. The shaft (4) can be tubular to provide a passage for drilling mud, or for a fluid being pumped.

22 Claims, 1 Drawing Sheet

ELECTRIC MOTOR

FIELD OF THE INVENTION

The invention relates to an electric motor and more specifically to an electric motor suitable for use in drilling and fluid systems where a high torque at a relatively low speed is required.

BACKGROUND OF THE INVENTION

A rotary drive having high torque at a relatively low speed can be obtained from a conventional electric motor, which provides low torque at high speed, by use of appropriate gearing, but this represents an undesirable complication. Alternatively, a high torque, low speed drive can be obtained by a special design of the motor, but this tends to require the motor to be of very large size. It is accordingly an object of the invention to provide an electric motor providing a high torque at low speeds without the use of gearing.

It is also an object of the invention to provide an electric motor of compact construction, in particular in the direction transverse of the drive shaft.

It is also one object of the invention to provide an electric motor which can be energised so as to move an output shaft rotationally about its axis and/or translationally along its axis.

SUMMARY OF THE INVENTION

The invention provides an electric motor comprising a frame or housing around an output shaft, electrically energizable drive means carried by one of the frame or housing and the shaft, and driven means carried by the other of the housing and the shaft, the drive means and the driven means having co-operating adjacent faces extending laterally of the shaft axis, and the driven means being responsive to energization of the drive means to effect relative rotation of the housing and the shaft about the shaft axis.

The drive means may comprise windings wound in the manner of linear electric motor windings but extending around the shaft axis in a circular path so as to carry the driven means, which can comprise magnetic material, around the axis. A high torque can be obtained because the motor structure of the invention allows a large effective "motor area" between the motor elements, that is, the drive windings and the co-operating driven element.

For most purposes, the invention can be embodied in a motor having a housing of circular cylindrical shape with the shaft journalled along its axis by suitable bearings, so as to function as an output or drive shaft. The driven means is conveniently carried by the shaft and preferably comprises a plurality of axially spaced rotor discs elements of magnetic material, which may be selected to maximise the drive effect of the energization of the drive means. The drive means then comprises a plurality of annular stator windings carried by the housing so that each is located adjacent at least one side of a respective rotor disc. Each rotor disc can advantageously be received between two of the annular stator windings which are energized in common.

A motor embodying the invention can be energized asynchronously, in simple, robust applications, when the driven means can comprise laminated or solid material, or synchronously to obtain greater efficiency, when the driven means can comprise permanent magnets. Effective cooling may be required, as by forced circulation of a cooling fluid, for example, an oil which may function additionally as a lubricant for the motor bearings. The circulation can be effected by an external pump or by an impeller on the motor shaft.

The shaft and the frame or housing can be journalled together for relative rotation by conventional bearings located between them. Alternatively such bearings can be located between the shaft motor elements and the housing. Hydrodynamic and hydrostatic bearings can be integrated with the motor elements and housing, and the motor elements can be arranged and energized so as to provide an electromagnetic bearing effect.

The configuration of the drive elements of the motor of the invention provides the advantage over that of conventional electric motors that the stator means does not have to surround the rotor means, but need exceed it in diameter essentially by no more than the thickness of the supporting housing wall. A plurality of the co-operating rotor and stator means can be stacked along the shaft to provide a motor which provides a desired high output torque at a readily controllable speed. The motor can be extremely compact, particularly in its transverse dimension, and is consequently very suitable for incorporation in pipe stacks used in drilling and fluid extraction systems. It can thus be employed for driving drill bits and low speed borehole pumps, for example, screw pumps. The motor can be readily incorporated in pump systems such as are described in EP 0 063 444.

A further improvement in compactness can be obtained by employing a hollow motor shaft which can be used for example, for passage of a fluid being pumped or for supply of drilling mud.

Although axial spacing between the drive windings and the driven elements is desirably small to maximize efficiency, clearance can be provided in a motor according to the invention so that desired axially directed forces between the windings and the driven elements can be generated by selective energization of the former. The resulting relative axial movement of the housing and the shaft can be controlled as to direction and timing so as to be employed for example to effect braking of shaft rotation, or as a hammering action as may be advantageous when the motor is driving a drill bit.

Where a plurality of drive windings are provided, the translational relative movement of the shaft and housing can be electrically powered in both directions, but the powered stroke can be resisted by a suitable form of spring providing energy for the return stroke.

The invention thus also provides an electric motor comprising a housing having a shaft received therein for relative movement of the shaft and housing along the shaft axis, and co-operating electrical drive an driven elements on the shaft and housing or on the housing and shaft respectively, the drive and driven elements being such that energization of the drive element effects the relative movement in at least one direction.

BRIEF DESCRIPTION OF THE DRAWINGS

The invention is further described below, by way of example, with reference to the accompanying drawings, in which.

Figure 1:
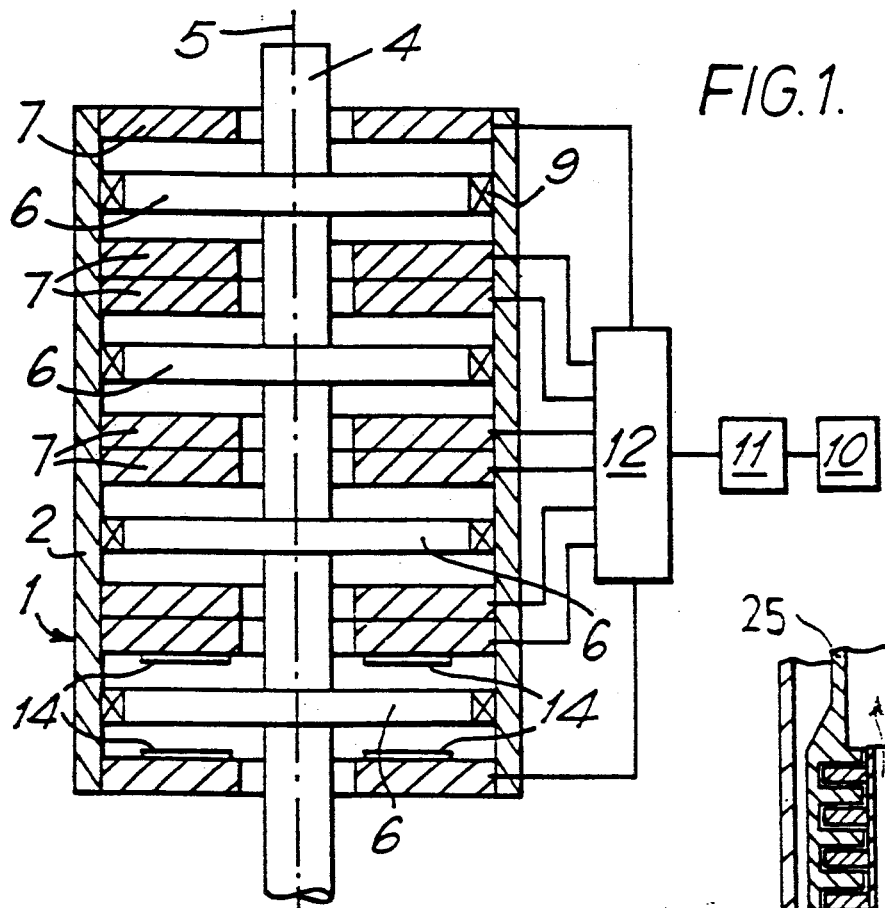
FIG. 1 is a sectional schematic front view of an electric motor embodying the invention.

The illustrated electric motor comprises a frame or housing having a wall 2 of circular cylindrical crosssection, and a motor drive or output shaft 4 extending along the axis 5 of the housing and protruding beyond its ends. The drive shaft 4 carries at equally spaced intervals along it a selected number of like rotor elements 6, each in the form of a co-axial circular disc of magnetic material secured to the shaft. Each rotor element 6 is received axially between two annular stator elements 7 which are concentric with the shaft 4 and secured at their outer peripheries to the housing wall. The two outer stator elements 7 form end walls to the housing 2 and the inner stator elements are stacked together in pairs in contact, with each pair between each adjacent spaced pair of the rotor elements 6.

The housing wall 2 and shaft 4 are journalled together for relative rotation about their common axis 4, and, as shown at the upper only of FIG. 1, the housing wall supports bearing means 9 operative between it and the peripheral outer edges of the rotor elements 6. Additionally or instead, such bearings could extend between the stator elements 7 and the shaft 4.

The stator elements 7 each comprise windings as employed in linear electric motors but with the windings arranged to extend not linearly but in a circular configuration, so as to effect rotation in a selected direction of the elements 6 and thus of the shaft 4 when energized. The stator elements 7 are energised asynchronously, or preferably synchronously, by an AC and/or DC power supply derived, from an external power source 10 by way of a frequency converter 11.

The illustrated electric motor is shown with axial spacing between the rotor elements 6 and the stator elements 7 and this spacing permits operation of the motor so that the rotational movement of the drive shaft 4 is replaced or supplemented by an axial reciprocating movement, as when the shaft or the housing is driving a drill bit. To achieve such operation, the energisation of the stator elements 7 is appropriately controlled by means of a control unit 12. The bearing means 9 are such to permit the resulting limited axial movement of the shaft 4.

Thus by appropriately energising, for example, only the lower of each pair of the stator elements 7, as shown in FIG. 1, the rotor elements 5 and the shaft 4 are moved downwardly, with or without a rotational movement, and by energising only the upper one of each pair of stator elements 7, the shaft is urged upwardly. A hammer action of the shaft 4 can thus be obtained. The axial movement of the shaft 4 can be limited by appropriate stop means, for example, abutments 14 provided on the radial faces of the stator element 7 as shown at the lower part of FIG. 1, to avoid physical contact between the rotor and stator elements. The stop means can be arranged to have a braking effect on shaft rotation if required.

To remove the heat developed by energization of the windings of the stator elements 6, forced circulation of cooling fluid through the housing can be provided. The cooling fluid can be a lubricant, to lubricate the bearing means 9. The shaft 4 can be hollow to provide a path for inclusion in the fluid circulation circuit. A fluid circulated through the motor can have a bearing function by providing hydrodynamic and/or hydrostatic bearing, and it can absorb or distribute shocks resulting from the hammer action of the shaft.

Figure 2:
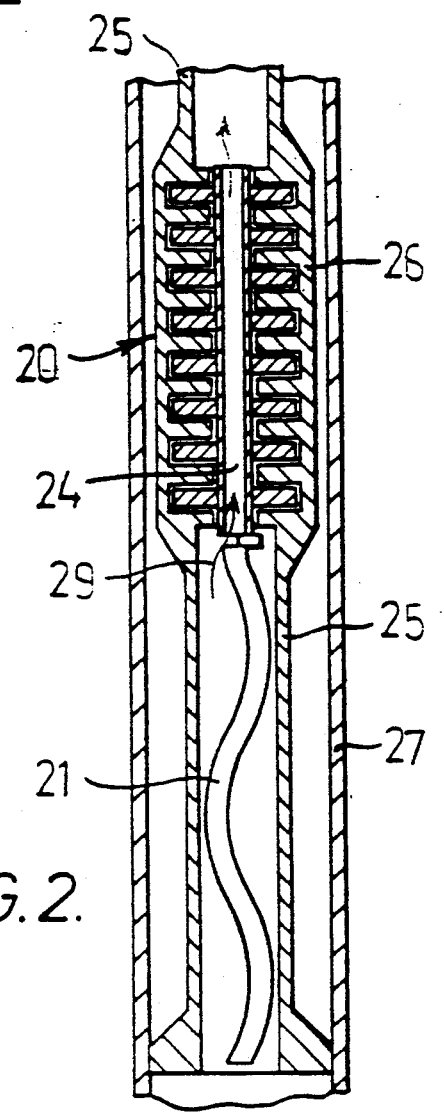
FIG. 2 is a like view of a second electric motor embodying the invention incorporated in a pump unit.

The electric motor 20 of FIG. 2 corresponds in essential particulars to the motor of FIG. 1, but is incorporated in a borehole pump unit for which only a rotational output is required and the facility for axial, translational, movement is accordingly not required, although it can be provided if braking of the motor should be required.

The pump unit of FIG. 2 comprises a Moineau-type displacement element 21 coupled to the lower end of the motor drive shaft 24 so as to be rotated by the motor within tubing 25 of which the motor housing 26 forms a part. The tubing 25 is received within production casing 27. At least the portion of tubing 25 above the housing 26 conveniently comprises electric conductor means providing power for the motor 20. The conductor means can comprise concentric tubular conductors separated by solid insulating sleeving or by dielectric or barrier fluid circulated through passages in which the motor housing may be included. Reference may be made to EP 0 063 444 for further particulars of such conductor and fluid arrangements.

The motor shaft 24 can be tubular so as to provide a passage for a fluid being pumped, as indicated by arrows 29, through into the tubing 25, with a further improvement in compactness.

The invention can be embodied in other ways than as specifically described and illustrated.

I claim:

1. An electric motor comprising:
   a housing,
   an output shaft having a longitudinal axis,
   means mounting said shaft in said housing for relative rotation around said axis and relative translation along said axis,
   electrical drive means carried by one of said shaft and said housing, said drive means comprising a plurality of axially spaced linear motor type annular windings oriented around said axis,
   driven means comprising a plurality of axially spaced discs of magnetic material carried by the other of said shaft and said housing, said drive and driven means having co-operating faces extending laterally of said shaft axis, and said drive means being energizable to act on said driven means, and
   energizing means selectively operable to energize said drive means so as to cause at least one of said relative rotation and said relative translation.

2. The electric motor of claim 1 further comprising energization control means adapted to effect energization of selected ones of said annular windings to effect said relative axial translation.

3. The electric motor of claim 2 further comprising braking or abutment means carried by at least one of said co-operating faces of said discs and said annular windings.

4. The electric motor of claim 1 wherein said housing comprises a circular cylindrical housing having an axis, said mounting means journal said shaft coaxially with said housing, said annular windings (7) are mounted in said housing and said discs are mounted on said shaft.

5. The electric motor of claim 1 having said plurality of driven means located between a respective associated pair of said drive means.

6. The electric motor of claim 1 wherein said driven means comprise at least one permanent magnet and said energizing means is adapted for synchronous operation of said motor.

7. The electric motor of claim 1 wherein said mounting means comprise bearings carried by at least one of said drive means and said driven means.

8. The electric motor of claim 1 wherein said shaft is tubular to provide a fluid passage therethrough.

9. The electric motor of claim 1 further comprising means for circulating fluid through said housing for providing at least one of cooling, lubrication, hydrodynamic bearing, hydrostatic bearing and shock absorbtion.

10. An electric motor comprising:
a housing,
an output shaft having a longitudinal axis, mounting said shaft in said housing for relative rotation around said axis and relative translation in at least one direction along said axis,
electrical drive means comprising a plurality of winding means mounted on said housing,
driven means comprising a plurality of axially spaced discs magnetic material mounted on said shaft, said drive and driven means having co-operating faces extending laterally of said shaft axis, and said drive means being energizable to act on said driven means, and
energizing means selectively operable to energize said drive means so as to cause at least one of said relative rotation and said relative translation.

11. The electric motor of claim 10 wherein said energizing means is adapted to energize at least a selected one of said winding means to effect said axial translation in one direction and at least one selected other of said winding means to effect said axial translation in the other direction.

12. A pump unit comprising the electric motor of claim 1 and an impeller means driven by said shaft.

13. A drilling unit comprising the electric motor of claim 2 and a drill bit driven by said shaft.

14. An electric motor comprising:
a generally cylindrical housing having a longitudinal axis,
a drive shaft extending along said longitudinal axis,
bearing means journalling said drive shaft in said housing for relative rotation about said axis,
a plurality of discs of magnetic material coaxially secured to said drive shaft at positions spaced therealong, said bearing means being operative between the peripheral outer edges of said discs and said housing,
a plurality of annular electric winding elements secured to said housing internally thereof at positions spaced therealong, with each of said rotor discs between two of said plurality of electric winding elements, and
energizing means for energizing said winding elements so as to effect said relative rotation of said housing and said shaft.

15. A pump unit comprising the electric motor of claim 14 wherein said drive shaft is hollow and the interior thereof communicates through said housing, and impeller means driven by said drive shaft to move fluid through said shaft interior.

16. The electric motor of claim 14 wherein said energizing means are selectively operable to energize said windings so as to effect reciprocating translation of said shaft along said axis.

17. A drilling unit comprising electric motor of claim 16 and a drill bit carried by said shaft.

18. An electric motor comprising:
a drive shaft,
frame means around said drive shaft,
mounting means mounting together said drive shaft and frame means for relative translational movement along said axis,
at least one driven member of magnetic material secured to one of said shaft and said frame means,
at least one electrical winding means secured to the other of said shaft and said frame means, said at least one driven member and said at least one electrical winding means each having a face extending transversely of said drive shaft,
braking or abutment means carried by at least one of said transversely extending faces adapted to prevent engagement of said at least one driven member and said at least one electrical winding means, and
energizing means for energizing said electrical winding means so as to effect said relative translational movement.

19. A drilling unit comprising the electric motor of claim 18 and a drill bit carried by said shaft.

20. An electric motor comprising:
a housing,
an output shaft having a longitudinal axis mounting said shaft in said housing for at least one of relative rotation around said axis and relative translation along said axis,
electrical driven means comprising a plurality of axially spaced discs of magnetic material mounted on said shaft,
drive means comprising a plurality of winding means mounted in said housing, said drive and driven means having co-operating faces extending laterally said shaft axis, and said drive means being adapted to act on said driven means to effect said at least one of relative rotation and translation of said shaft and said housing, and
energizing means adapted to energize at least a selected one of said winding means to effect said axial translation in one direction and at least one selected other of said winding means to effect said axial translation in the other direction.

21. An electric motor comprising:
a housing,
an output shaft having a longitudinal axis,
means mounting said shaft in said housing for relative movement of said shaft and said housing along said axis,
electrical drive means carried by one of said shaft and said housing,
driven means carried by the other of said shaft and said housing, said drive means being energizable to act on said driven means to effect said relative movement in a selected one of a first direction and the direction opposite thereto, and
energizing means adapted to energize said drive means to effect said movement.

22. The electric motor of claim 10, wherein said driven means comprises a plurality of axially spaced discs of magnetic material and said drive means comprises a plurality of axially spaced annular windings, and wherein said energizing means is adapted to energize different ones of said annular windings to effect said movements in said first and said opposite direction.

* * * * *